(12) United States Patent
Wilkerson et al.

(10) Patent No.: US 8,965,319 B2
(45) Date of Patent: *Feb. 24, 2015

(54) METHODS AND DEVICES FOR REDUCING RADIO FREQUENCY INTERFERENCE

(71) Applicant: Physical Devices, LLC, Durham, NC (US)

(72) Inventors: Jonathan Ryan Wilkerson, Raleigh, NC (US); Frederick Vosburgh, Durham, NC (US)

(73) Assignee: Physical Devices, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/194,924

(22) Filed: Mar. 3, 2014

(65) Prior Publication Data

US 2014/0235190 A1    Aug. 21, 2014

Related U.S. Application Data

(63) Continuation of application No. 13/271,420, filed on Oct. 12, 2011, now Pat. No. 8,666,347.

(60) Provisional application No. 61/393,157, filed on Oct. 14, 2010, provisional application No. 61/393,163, filed on Oct. 14, 2010.

(51) Int. Cl.
*H04B 1/10* (2006.01)
*H04B 7/08* (2006.01)

(52) U.S. Cl.
CPC ............... *H04B 1/10* (2013.01); *H04B 7/0894* (2013.01); *H04B 1/109* (2013.01)
USPC .................. 455/296; 455/63.1; 455/278.1

(58) Field of Classification Search
CPC ............................. H04B 1/10; H04B 1/7103
USPC ............ 455/63.1, 278.1, 296, 307, 303, 340, 455/562.1
See application file for complete search history.

(56) References Cited

U.S. PATENT DOCUMENTS

| | | |
|---|---|---|
| 4,085,368 A | 4/1978 | Yeh |
| 5,179,727 A | 1/1993 | Imagawa |
| 5,252,930 A | 10/1993 | Blauvelt |
| 5,412,735 A | 5/1995 | Engebretson et al. |
| 5,712,641 A | 1/1998 | Casabona et al. |
| 5,736,909 A | 4/1998 | Hauser et al. |
| 5,783,977 A | 7/1998 | Chethik |

(Continued)

FOREIGN PATENT DOCUMENTS

| | | |
|---|---|---|
| EP | 1 727 277 A1 | 11/2006 |
| WO | WO 2012/030658 A2 | 3/2012 |

(Continued)

OTHER PUBLICATIONS

Extended European Search Report for European Application No. 11822404.7 (Jan. 17, 2014).
Notice of Allowance and Fee(s) Due for U.S. Appl. No. 13/271,420 (Oct. 15, 2013).
Bharadia et al., "Full Duplex Radios," pp. 1-12 (Aug. 12, 2013).

(Continued)

*Primary Examiner* — Sonny Trinh
(74) *Attorney, Agent, or Firm* — Jenkins, Wilson, Taylor & Hunt, P.A.

(57) ABSTRACT

Devices and methods for selectively reducing interference in wireless signals through field nulling and signal cancelling by signal agnostic, intrinsically stable, analytic means.

18 Claims, 7 Drawing Sheets

(56) References Cited

U.S. PATENT DOCUMENTS

| | | | |
|---|---|---|---|
| 5,872,540 | A | 2/1999 | Casabona et al. |
| 6,323,806 | B1 | 11/2001 | Greving |
| 6,359,503 | B1 | 3/2002 | Alini et al. |
| 6,363,263 | B1 | 3/2002 | Reudink et al. |
| 6,486,828 | B1 * | 11/2002 | Cahn et al. ............ 342/363 |
| 6,639,541 | B1 | 10/2003 | Quintana et al. |
| 6,710,739 | B1 | 3/2004 | Loegering |
| 6,961,577 | B2 * | 11/2005 | Nagato et al. ............ 455/450 |
| 7,139,592 | B2 * | 11/2006 | Leifer et al. ............ 455/562.1 |
| 7,904,047 | B2 | 3/2011 | Darabi |
| 8,032,103 | B2 | 10/2011 | Lackey |
| 8,064,837 | B2 | 11/2011 | Sampath |
| 8,086,206 | B1 | 12/2011 | Lackey |
| 8,090,338 | B1 | 1/2012 | Lackey |
| 8,090,339 | B1 | 1/2012 | Lackey |
| 8,355,676 | B2 * | 1/2013 | Franklin ............ 455/63.1 |
| 8,666,347 | B2 | 3/2014 | Wilkerson et al. |
| 8,682,275 | B2 * | 3/2014 | Kerth et al. ............ 455/300 |
| 2003/0130751 | A1 | 7/2003 | Lim |
| 2008/0136473 | A1 | 6/2008 | Bollenbeck et al. |
| 2010/0178874 | A1 | 7/2010 | Chiou et al. |
| 2010/0244943 | A1 | 9/2010 | Hahn et al. |
| 2011/0019722 | A1 | 1/2011 | Amirkhany |
| 2011/0227665 | A1 | 9/2011 | Wyville |
| 2012/0025929 | A1 | 2/2012 | Muterspaugh et al. |
| 2012/0201153 | A1 | 8/2012 | Bharadia et al. |
| 2012/0201173 | A1 | 8/2012 | Jain et al. |
| 2012/0252392 | A1 | 10/2012 | Wilkerson et al. |
| 2013/0225099 | A1 | 8/2013 | Vosburgh et al. |
| 2014/0152499 | A1 | 6/2014 | Vosburgh et al. |
| 2014/0199956 | A1 | 7/2014 | Wilkerson |

FOREIGN PATENT DOCUMENTS

| | | |
|---|---|---|
| WO | WO 2013/056270 A1 | 4/2013 |
| WO | WO 2013/130818 A1 | 9/2013 |
| WO | WO 2014/113613 A1 | 7/2014 |

OTHER PUBLICATIONS

Notification of Transmittal of the International Search Report and the Written Opinion of the International Searching Authority, or the Declaration for PCT International Patent Application No. PCT/US2013/028338 (Jul. 25, 2013).

Notice of Allowance and Fee(s) Due for U.S. Appl. No. 13/271,420 (Jun. 25, 2013).

Communication of European Publication Number and Information on the Application of Article 67(3) EPC for European Patent Application No. 11822404.7 (Jun. 12, 2013).

Notification of Transmittal of the International Search Report and the Written Opinion of the International Searching Authority, or the Declaration for PCT International Patent Application No. PCT/US2012/066259 (Mar. 28, 2013).

Commonly-assigned, co-pending U.S. Appl. No. 13/781,226 for "Methods, Systems, and Computer Readable Media for Mitigation of In-Band Interference of Global Positioning System (GPS) Signals," (Unpublished, filed Feb. 28, 2013).

Non-Final Action for U.S. Appl. No. 13/271,420 (Feb. 6, 2013).

International Search Report for International Patent Application No. PCT/US2011/049399 (Mar. 2, 2012).

Jain et al., "Practical, Real-time, Full Duplex Wireless," pp. 1-12 (Sep. 19, 2011).

U.S. Appl. No. 61/485,980 for "Adaptive Techniques for Full-Duplex Wireless," filed May 13, 2011.

U.S. Appl. No. 61/462,493 for "Single Channel Full-Duplex Wireless Communication," filed Feb. 3, 2011.

Choi et al., "Achieving Single Channel, Full Duplex Wireless Communication," pp. 1-12 (Sep. 20, 2010).

Communication of European Publication Number and Information on the Application of Article 67(3) EPC for European Patent Application No. 12839313.9 (Jul. 23, 2014).

Notification of Transmittal of the International Search Report and the Written Opinion of the International Searching Authority, or the Declaration for PCT International Patent Application No. PCT/US2014/011941 (Apr. 29, 2014).

* cited by examiner

METHODS AND DEVICES FOR REDUCING RADIO FREQUENCY INTERFERENCE

CROSS-REFERENCE TO RELATED APPLICATIONS

This application is a continuation of U.S. patent application Ser. No. 13/271,420, filed Oct. 12, 2011, which claims the benefit of the filing dates of U.S. Provisional Patent Application Ser. No. 61/393,157 entitled "Methods and Devices for Reducing Radio Frequency Interference" and filed on Oct. 14, 2010 and U.S. Provisional Patent Application Ser. No. 61/393,163 entitled "Communications Antenna Field Nulling" and filed on Oct. 14, 2010.

The aforementioned patent applications are hereby incorporated by reference in their entirety.

STATEMENT REGARDING FEDERALLY SPONSORED RESEARCH OR DEVELOPMENT

None.

BACKGROUND OF THE INVENTION

1. Field of the Invention

The present invention relates to enhancing reception of wireless signals. More specifically, it relates to selective mitigation of interference.

2. Brief Description of the Related Art

Wireless devices such as cell phones and radios operate in the face of ever increasing interference, be it inadvertent or intentional, which reduces or eliminates the link margin required for the reception of voice or other data. Interference, therefore, reduces the effectiveness of national defense while hastening the time when demand for connectivity exceeds available spectrum capacity.

While the U.S. government is making spectrum at white space frequencies available for consumer use, the interference created by the powerful TV transmissions at adjacent frequencies may limit the quality of service in that spectrum. Clearly, low cost technology providing enhanced quality of service at white space frequencies is desirable.

Radar and related devices use null steering to suppress interference that hinders detection and tracking capabilities. The array antennas that support steering, however, are power hungry, complex and costly, as well as not readily portable. Null steering also requires interference bearing data, which is often not available a priori and is calculated by computationally demanding methods. Clearly, technology that is small enough to integrate into mobile handsets and other radios which can mitigate interference without large arrays of elements and without requiring statistical processing is desirable.

Cosite interference between co-located antennas is a common problem, such as aboard ships where large numbers of antennas must be co-located in limited space, limiting the use of positioning minimize cosite interaction between transmit and receive antennas. As a result, co-located antennas use time sharing to avoid interference reducing the utility of the transmitters and receivers alike. Clearly, technology that can reduce cosite interference without time sharing or other utility limiting approaches is desirable.

Side-lobe blanking has also been described for array antennas, in which temporal segments of signals that include burst interference are excised or ignored. Unfortunately, blanking introduces periods of blindness in reception, rendering an array useless in the face of continuous interference. Clearly, low cost technology that can remove interference without interruption is desirable.

Digital signal processing is proposed to reduce interference such as by using matched filtering and blind source separation. Matched filtering requires a priori information or development of a statistic model of the signal. Unfortunately, waveform data typically is unavailable for dynamic adversarial intentional signals. Blind source separation has been disclosed for isolating desirable signals from interference, which requires substantial amounts of data and processing time. Clearly, technology that can adapt quickly and inexpensively while maintaining effectiveness in the face of dynamic interference is desirable.

SUMMARY OF THE INVENTION

The first object of the invention is to provide enhanced signal to noise ratio of a received wireless signal. A second object is to selectively reduce interference by signal agnostic means. A third object is to augment communication signal amplitude. A fourth object is nulling of interference fields proximate antennas. A fifth object is hardware cancellation of interference in antenna signals. A sixth object is combined field nulling and signal cancelling of interference. A seventh object is cosite reduction.

In a preferred embodiment, the present invention is a device for reducing interference in wireless signals. The device comprises a plurality of antennae, at least one stage connected to the plurality of antennae with the stage being one of a field nulling stage and a signal cancelling stage, a signal detector, a processing unit and a signal modifier. The at least one stage, the signal detector, the processing unit and the signal modifier provide a signal-to-noise-ratio enhanced signal to a receiver. The at least one stage may comprise a field nulling stage having a receiving antenna, a transmitting antenna, a returning signal receiving circuit and a communications antenna signal delay element. The at least one stage additionally or alternatively may comprise a signal cancelling stage having a first antenna of a first type, a second antenna of a second type and a signal combiner. The signal modifier may comprise at least one of an amplitude equalizer, a phase shifter, and a group delayer. The signal modifier may further comprise a first channel and a second channel where the first channel comprises an amplitude equalizer and phase shifter and the second channel comprises a delay element. The signal modifier may comprise at least one of: a variable amplifier, a vector modulator, an active inductor and a frequency selection filter. The return signal receiving circuit may be connected to the processing unit and may comprise at least one of: a hardwires connection and a through-space signal receiver. The communications antenna delay element may comprise at least one of: an active delay element, a passive delay element, a variable delay element, a fixed delay element, and a selectable delay element. The wireless signals may be of any type of desirably transmitted data and any frequency of electromagnetic radiation.

In another preferred embodiment, the present invention is a method for reducing interference in wireless signals. The method comprises the steps of receiving a plurality of RFI burdened signals, modifying at least one received RFI burdened signal, providing at least one of field nulling and signal cancelling with respect to the at least one received RFI burdened signal and producing a signal-to-noise-ratio enhanced signal. The step of providing at least one of field nulling and signal canceling may comprise signal cancelling conducted by combining a first antenna signal modified with respect to at least one of amplitude and phase and a second antenna signal modified with respect to at least one group delay. The step of providing at least one of field nulling and signal canceling may comprise field nulling conducted by transmitting a receiving antenna signal that has been modified with respect to at least one of; amplitude and phase to establish a nulling field proximate a communications antenna, which nulling field is substantially amplitude equivalent to and anti-phase with respect to RFI content of a second field generated proximate communications antenna by an RFI burdened signal. The step of modifying at least one received RFI burdened signal may comprise at least one of: amplitude equalizing, employing amplitude detecting and phase shifting, and determining a phase shift from a change in a combined signal amplitude resulting from a test phase shift. The step of modifying at least one received RFI burdened signal may comprise determining an enhanced phase shift from a change in a combined signal amplitude resulting from a test phase shift. The step of modifying at least one received RFI burdened signal may comprise at least one of: amplitude updating, phase shift updating, and delay updating. The method may further comprise the step of determining an RFI state, wherein the RFI state is at least one of: present, not present, weak and strong. The method also may further comprise the step of selecting interference between antenna signals based on a determined RFI state. The step of providing at least one of field nulling and signal canceling may comprise field nulling followed by signal cancelling. The wireless signals comprise any type of desirable transmitted information and any frequency of electromagnetic radiation.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
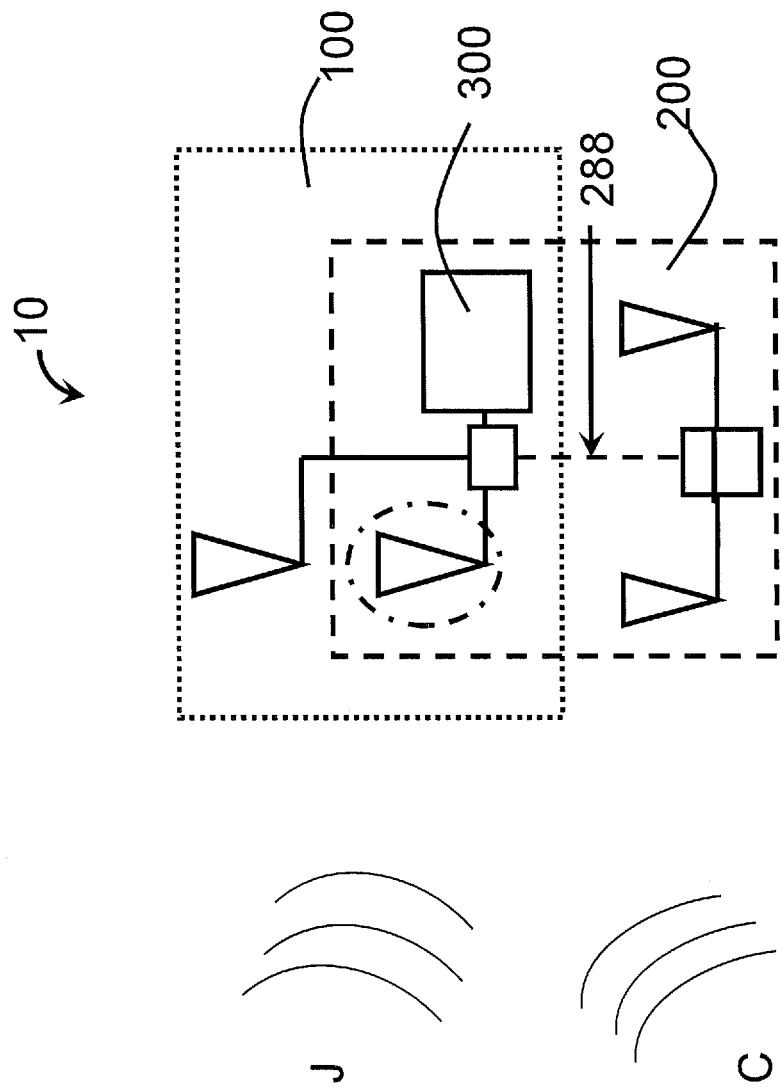
FIG. 1 is a schematic of field nulling and signal cancelling stages in accordance with a preferred embodiment of the present invention.

The present invention comprises devices and methods for reducing radio frequency interference (RFI) to enhance wireless communications reception. Devices of the present invention employ intrinsically stable stages for signal cancellation and/or for field nulling. The devices may include a plurality of field nulling and signal cancelling stages to reduce RFI from more than one source.

The present invention modifies one or more received signal and provides nulling and/or cancelling signals to selectively mitigate RFI and, thereby, enhance signal to noise ratio (SNR) of signals provided to a secondary object such as a receiver or other active circuit. The present invention provides at least one of signal cancelling, field nulling and combined signal cancelling and field nulling. Signal cancellation is provided in hardware between an antenna and a receiver, field nulling is provided proximate to an antenna surface.

The present invention operates by feed forward means and analytically determined phase shift means. The invention has many applications, such as reducing jamming by a TV tower or an adversary and mitigating cosite interaction between co-located antennas. Mitigation of RFI enhances at least one of signal quality, dynamic range, reception range, bandwidth and quality of service for wireless receivers such as cell phones, radios, wireless networks and radar among other types of receivers.

An antenna signal is defined herein as an electrical signal induced in an antenna by a field proximate the antenna receiving surface. Antennas herein are referred to as first, second, receiving, transmitting and communications types, although other types are acceptable. Receiving antenna used in field nulling can additionally comprise first antenna for use in signal cancelling. A signal or field comprising communications content and RFI content is referred to here as "RFI burdened." RFI burdened fields and/or signals are characterized by signal to interference ratio (SIR. The invention comprises modifying and combining fields and/or signals of different SIR values to selectively reduce RFI content at one or more communication frequency.

The present invention provides controlled interference between signals in hardware and/or controlled interference between fields proximate an antenna. Destructive interference of RFI content is conducted when RFI content is strong. Constructive interference of communications content is conducted when RFI content is weak. RFI content here is termed strong when SIR<1 and weak when SIR≥1, although other definitions and SIR values are acceptable. In some cases, constructive interference of communications signals additionally can provide at least partial destructive interference of RFI, although this is not required. Destructive interference operates by substantially anti-phase aligning at one or more communication frequency of RFI content of a nulling field or cancelling signal with RFI content respectively of burdened field or signal.

The present invention is described in terms of modifying signals for use in antenna field nulling and in antenna signal cancelling, with nulling and cancelling being practiced in combination or separately. In combined use, field nulling is used to mitigate RFI content of an antenna field to reduce RFI content induced in an antenna, e.g. communications receiving antenna and, thereby, in communications antenna signals.

Signal cancelling is used to reduce RFI content of any burdened antenna signal, either following field nulling or independently.

It will be appreciated that field nulling differs from cancelling signals traveling through space, the latter requiring precisely aligned superposition of cancellation signals with the RFI content of signals propagating through space, an impracticable constraint in the vast majority of cases that is avoided by use of field nulling.

Field nulling can be used to defeat interference propagating from any direction by transmitting a nulling signal from a wide range of directions. The directional independence of field nulling is provided by employing the intrinsic field combining property of antennas. Field nulling requires only that nulling field and a desirably nulled portion of a burdened communications field be amplitude equalized and anti-phase aligned proximate the antenna surface. Nulling of RFI is made selective by establishing a nulling field characterized by an SIR differing from that of the burdened proximate the antenna. The invention provides field nulling and signal cancelling by feed forward and analytic phase shift determination means. Equalization of field nulling is conducted with respect to strength of RFI burden strength and with respect to antenna gain pattern for at least one type of; receiving antenna, transmitting antenna and communications antenna.

Referring to FIG. 1, an illustrative embodiment of device 10 comprises at least one of signal cancelling stage 100, field nulling stage 200 and a secondary device 300 such as the receiver stage of a cell phone or radio. Device 10 comprises any type of circuitry, such as analog, digital and mixed signal. In some cases, signal cancelling stage 100 is connected to signal nulling stage 200 by a hardware connection 288, although this is not required. Device 10 is any type that can reduce RFI, e.g. from a jammer (J) interfering with desirably received signals or, e.g., from a communications source (C).

Figure 2:
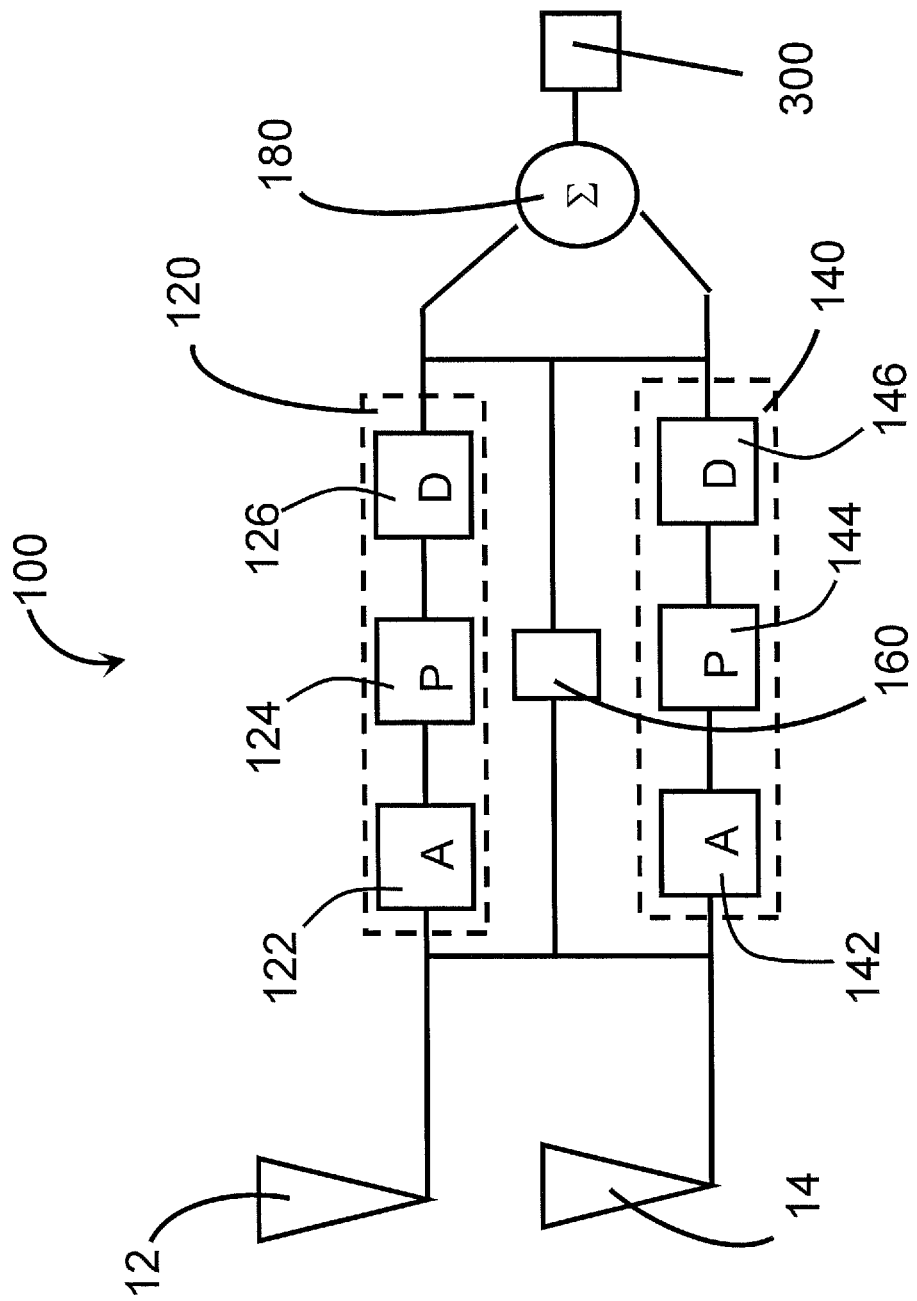
FIG. 2 is a schematic diagram of a signal cancelling stage in accordance with a preferred embodiment of the present invention.

Referring to FIG. 2, signal cancelling stage 100 is any type that can at least partly reduce RFI of an RFI burdened signal in hardware. Signal cancelling stage 100 comprises at least one of first antenna 12, second antenna 14, first channel 120, second channel 140, controller 160 and combiner 180. First channel 120 comprises any type that can modify a signal from first antenna 12. First channel 120 comprises at least one of amplitude modifier 122, phase modifier 124, and delay modifier 126. Second channel 140 comprises any type that can modify a signal from second antenna 14. Second channel 140 comprises at least one of amplitude modifier 142, phase modifier 144, and delay modifier 146. The amplitude modifiers, phase modifiers and delay modifiers can be any type of modifier, including but not limited to quadrature demodulators, vector modulators, variable gain amplifiers, gyrators, active inductors and tunable filters. The delay modifiers can comprise any type that can delay signal propagation in hardware.

Figure 3:
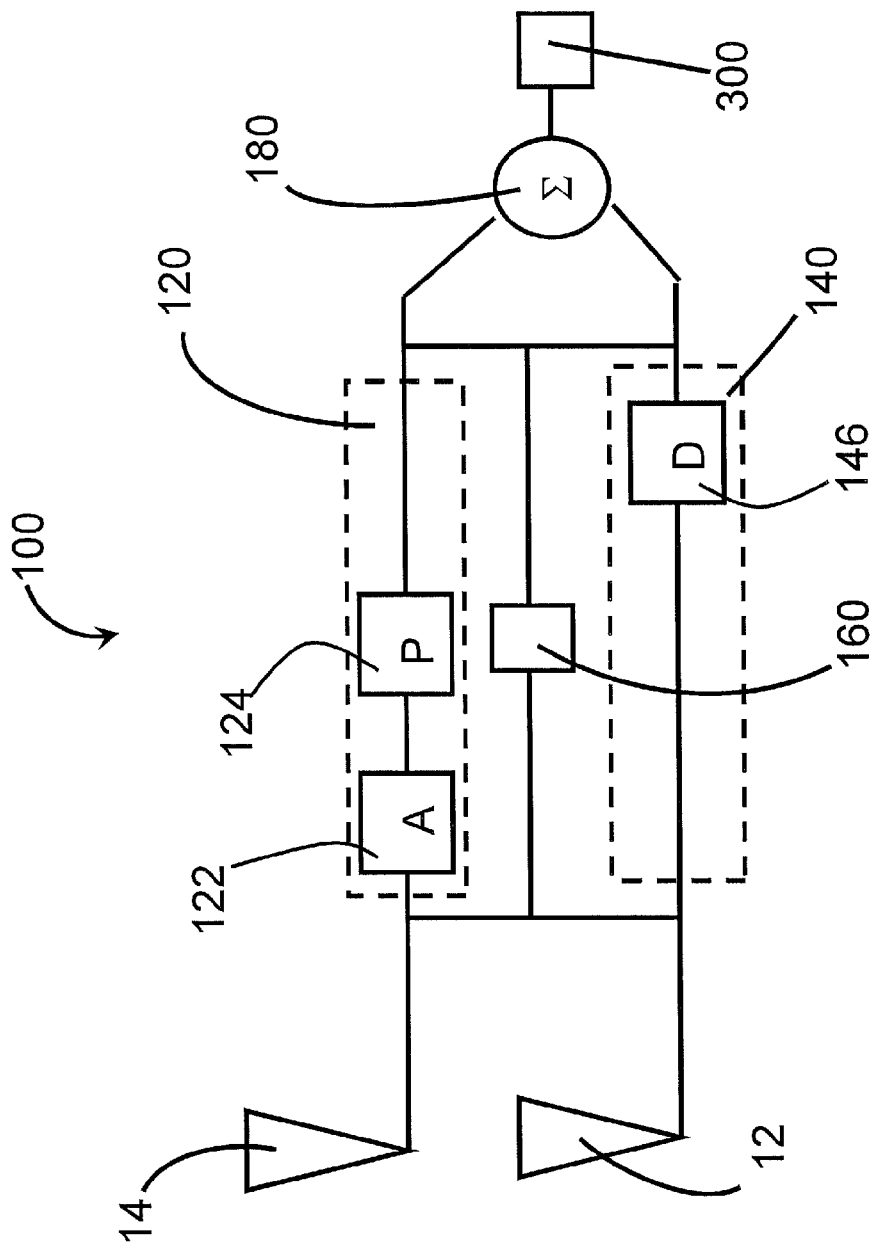
FIG. 3 is a schematic diagram of a signal cancelling stage in accordance with a preferred embodiment of the present invention.

Referring to FIG. 3, one among many acceptable embodiments of signal cancellation stage 100 comprises a first channel 120 further comprising amplitude modifier 122 and phase modifier 124 and a second channel 140 further comprising delay modifier 146. Amplitude modifier 122 can be of any type that can increase and/or decrease signal amplitude. Phase modifier 124 can be of any type that can modify signal phase. Delay element 146 is any type that can modify transit time of a signal. First channel 120 and/or second channel 140 can comprise a tuning component of any type that can further modify a signal with respect to at least one of amplitude, phase and delay. Controller 160 is any type that can control at least one type of device modifier component. Controller 160 comprises at least one of an amplitude sensor, a phase sensor, a modification calculator, a connection to output of antenna 12, 14 and a post modification connection to first channel 120 and/or second channel 140 prior to combiner 180.

Figure 4:
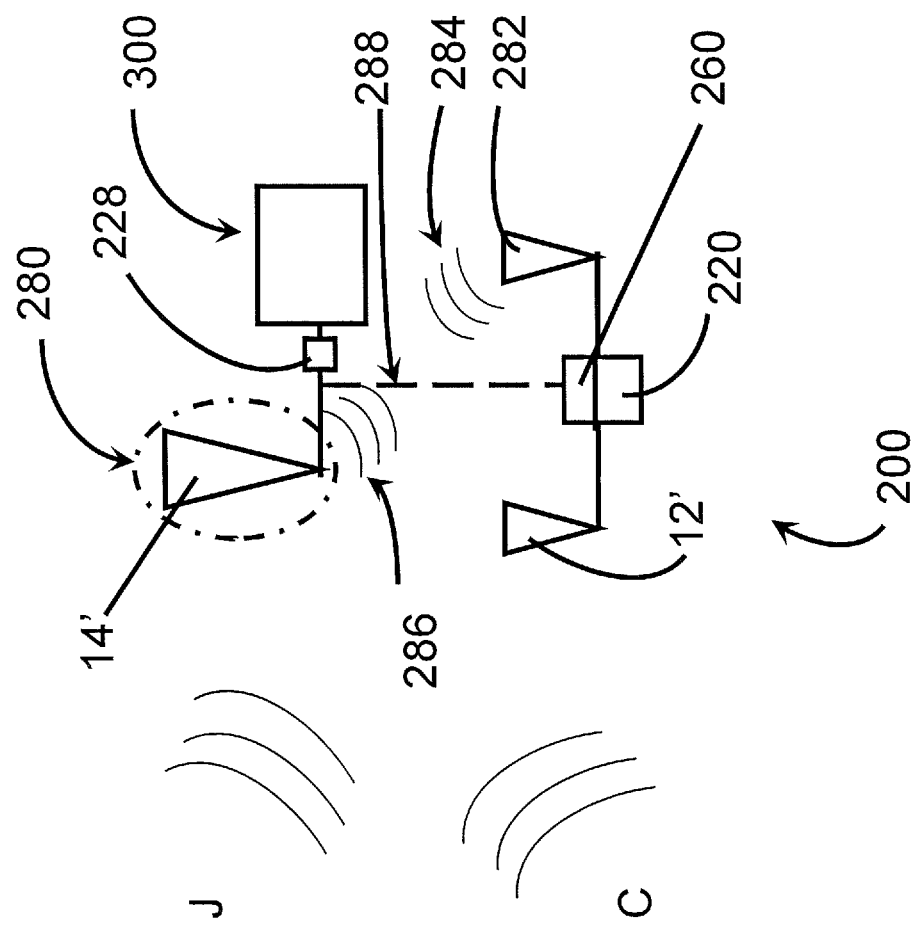
FIG. 4 is a schematic diagram of a field nulling stage in accordance with a preferred embodiment of the present invention.

Referring to FIG. 4, a field nulling stage 200 comprises receiving antenna 12', signal modifier 220, controller 260 and communications antenna 14'. Modifier 220 comprises at least one of an amplitude modifier and a phase modifier. In some cases, device comprises a delay modifier integrated into the antenna lead prior to the secondary device 300. Controller 260 is any type that can control modifier operations with respect to at least one of amplitude and phase of a receiving antenna signal.

Field nulling stage 200 comprises a second modifier 228 of any type that can modify at least one of amplitude, phase and delay of signals provided by communications antenna 14' and/or signal modifier 220. Second modifier 228 is any type that can delay communications antenna signal from communications antenna 14' in proportion to spatial separation between at least two of receiving antenna 12', transmitting antenna 282 and communications antenna 14'. In some cases, controller 260 can comprise a delay modifier of any type that can provide delay in proportion to the spatial separation. Second modifier 228 can combine signals, e.g. signals provided by communications antenna 14' and modifier 220.

Field nulling stage 200 is any type that can modify amplitude and/or phase receiving antenna signal based on a return signal received from communications antenna. In some cases, modifier is any type that can provide a modified signal in proportion to return signal.

Modifier 220, 228 comprises any type that can provide at least one of amplitude equalizing, phase shift, and delay inducing. Modifier 220, 228 comprises any type that can provide at least one of amplitude sensing, phase sensing, and frequency sensing.

Modifier 220, 228 is any type comprising at least one detector that can detect and/or quantify at least one of frequency, amplitude, phase and delay. Modifier 220 is any type of circuit that can controllably modify amplitude and/or phase of antenna signal, such as a tunable amplifier or tunable inductor.

Controller 260 is any type that can control modifying of a received signal as means of providing a nulling signal. Controller 260 is any type that can provide nulling signal to transmitting antenna 282 to establish nulling field 280 proximate communications antenna 14'. Controller 260 is any type that can process a return transmission 286 from communications antenna 14'. Hardware connection 288 is any type that can conduct a return signal between controller 260 and communications antenna 14' and/or second modifier 228. Return transmission 286 is at least one type of; return, reflected, re-radiated, scattered, nulling indicator and antenna coupling indicator.

It will be apparent that the devices in accordance with the present invention can have more than one receiving antenna and more than one communications antenna, e.g. a phased array receiver with several antenna elements acting as receiving elements to generate signals for signal cancellation and/or field nulling of signals from communications antennae.

Figure 5:
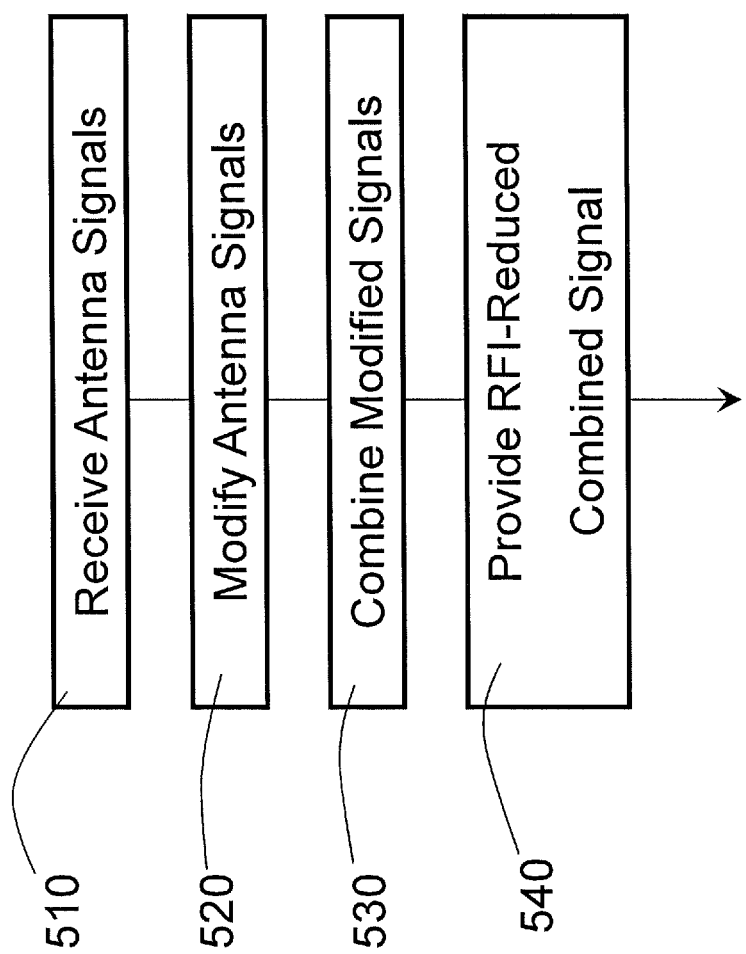
FIG. 5 is a flow diagram of a method for signal cancelling in accordance with a preferred embodiment of the present invention.

Referring to FIG. 5, a preferred embodiment of a method for signal cancelling in accordance with a preferred embodiment of the present invention comprises steps of: receiving (510) a first antenna signal and a second antenna signal, modifying (520) at least one antenna signal, combining (530) the modified signal and providing (540) an RFI-reduced combined signal. The modifying step comprises at least one step of amplitude equalizing, phase adjusting and delay adjusting. The modifying step may be conducted by any controllable means of providing at least one of detecting, determining desirable modification and modifying the signal with respect to at least one of amplitude, phase and delay. Determining a desirable modification may comprise at least one of measuring, probing, calculating, fine tuning and estimating a signal.

The modifying step may comprise at least one of amplitude adjusting, phase shifting, delay inducing. Amplitude adjusting or amplifying may be fixed, variable, continuous, controllable or frequency dependent amplification. Phase shifting may be continuous, fixed, variable or selectable phase shifting. Phase shifting can be provided by any means. One example is by vector modulation wherein a signal is split into real and imaginary components, which are amplified or attenuated and combined to provide a signal with a desired phase shift.

Phase shift determining, described here for signal cancelling, comprises providing a test phase shift of first antenna signal, combining shifted first antenna signal with second antenna signal, determining amplitude change of combined signal and calculating desirable phase shift according to the following analytic formula (I):

$$\phi_s = \pi + k \, arcos\left(\frac{\beta}{Z\alpha}\right) \quad (1)$$

wherein $\phi_S$ represents one or more frequency specific phase coefficient, k is a constant, which can have a value such as 1 or 2, and $\alpha$ and $\beta$ represent the frequency specific amplitudes of the first combined signal and second combined signal. In some cases, modifying can further comprise determining amplitude and/or phase by non-analytic method, such as measurement or gradient or statistical estimation. In some cases, analytic method and non-analytic method can be practiced sequentially to provide a fine tuned solution. It will be appreciated that the method also provides phase shifting for nulling signals.

Figure 6:
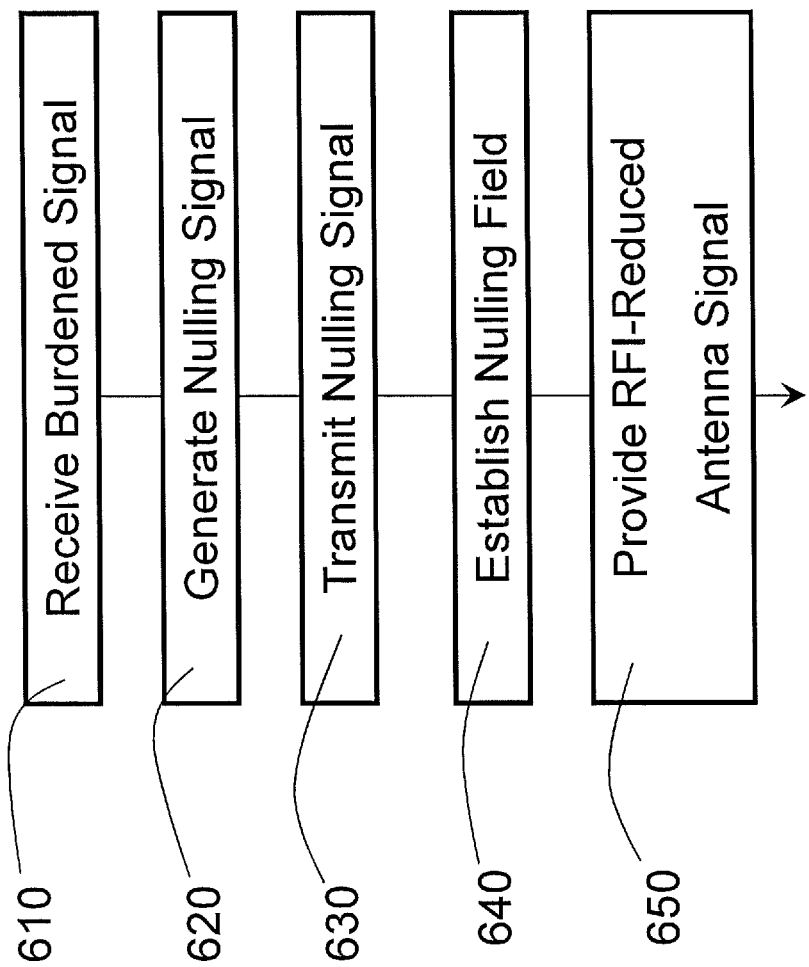
FIG. 6 is a flow diagram of a method for field nulling in accordance with a preferred embodiment of the present invention.

Referring to FIG. 6, the method for field nulling comprises at least one step of: using a receiving antenna to receive (610) an RFI burdened communications signal, generating (620) a nulling signal by means of received signal modifying, transmitting (630) a nulling signal, establishing (640) a nulling field proximate a communications antenna to cancel RFI content of field induced proximate the antenna by an RFI burdened signal striking the communications antenna, and providing (650) an RFI-reduced communications antenna signal.

According to the inventive method, modifying comprises calibration of field nulling stage with respect to at least one of a communications antenna pattern, a transmitting antenna pattern, orientation of a transmitting antenna, and separation between a transmitting antenna and a communications antenna. Calibrating may be conducted with respect to at least one of amplitude, phase and group delay.

Calibrating can be conducted by factory calibration, field calibration or any other method. Calibrating can comprise transmitting a test signal and processing a communications antenna signal and/or a return signal. Calibration can comprise measuring, looking up or estimating orientation and/or separation of receiving and/or communications antenna properties.

The method provides constructive interference in the same manner as destructive interference except that phase shift is further shifted by plus or minus 180 degrees. In some cases, the method comprises a step of selecting constructive and/or destructive type of interference based on SIR value of at least one antenna signal.

The method comprises introducing delay into a communications antenna signal and/or into a second antenna signal in the case of signal cancelling to minimize affect of spatial separation between antennas. Delay introducing can provide at least one enhancement of phase center alignment, bandwidth and RFI reduction and directional independence. It will be appreciated that the method comprising field nulling and signal cancelling stages can be conducted using a receiving antenna as a second antenna.

Amplitude equalization may comprise modifying a receiving antenna signal to provide a transmitted signal that can establish a nulling field proximate a communications antenna, the amplitude of which field is equivalent to that of the RFI content of an RFI burdened field also there proximate. Amplitude equalization for field nulling may comprise compensation for transmitting antenna gain pattern in direction of communications antenna and communications antenna gain pattern in direction of transmitting antenna, which compensation can be conducted by any means such as factory calibration, auto-calibration, estimation or manual input.

It will be appreciated that the invention can comprise a filtering stage of any type, such as a bandpass type that can reduce signal content at other than communication frequencies. It will also be appreciated that signal modifying and/or combining can be conducted using digitized antenna signals such as can be provided by a digitizing circuit comprised in the modifier.

Figure 7:
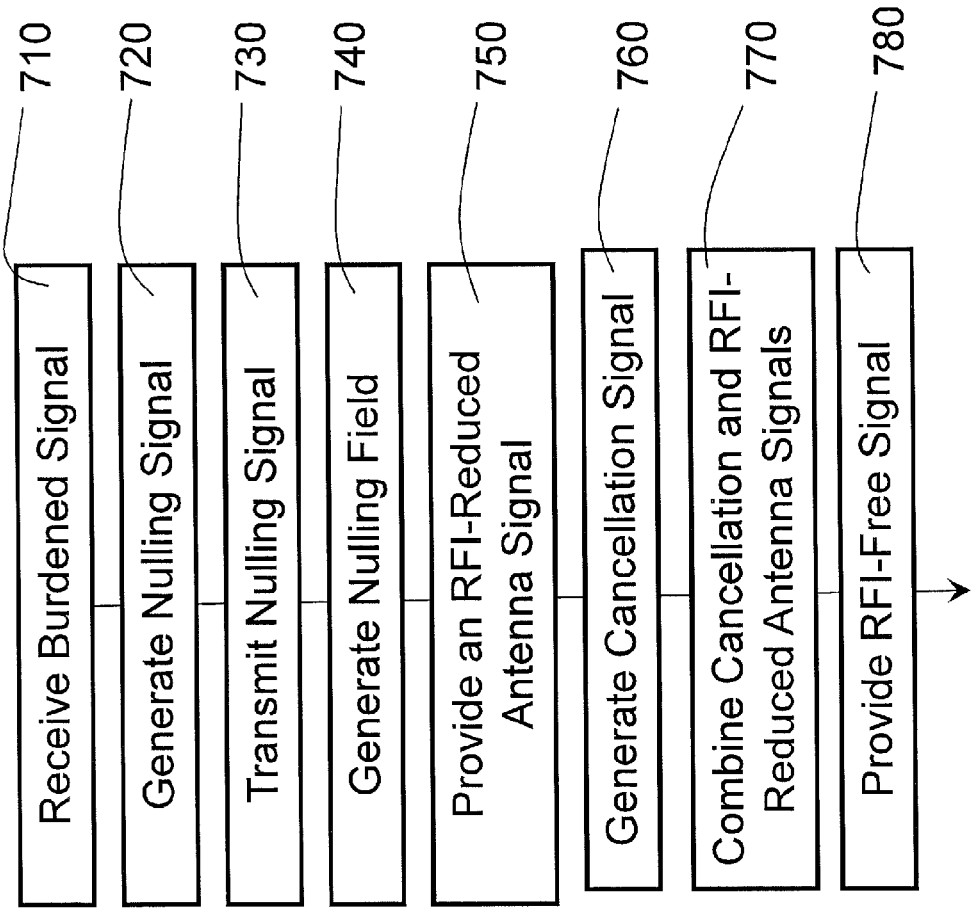
FIG. 7 is a flow diagram of a method for reducing interference in an RFI burdened signal in accordance with a preferred embodiment of the present invention.

Referring to FIG. 7, a method for combined field nulling and signal cancelling in accordance with another preferred embodiment of the present invention comprises joint practice of methods for field nulling and signal cancelling wherein field nulling is used to provide an at least partly RFI-reduced communications antenna signal which is then combined with a first antenna signal, e.g. from a receiving antenna or other antenna, which first antenna signal can be further modified by second modifier prior to such combining. Modifying, delaying, phase shift selecting by modifier and/or second modifier is practiced as described above. The method comprises determining communications antenna signal SIR and selecting type of interference based on said SIR.

The present disclosure is in terms of radio frequency signals and fields but is intended to cover any type of electromagnetic communications signal.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A device for reducing interference in wireless signals comprising:
   a plurality of antennae;
   at least one stage connected to said plurality of antennae, said stage being one of a field nulling stage and a signal cancelling stage;

a signal detector;
a processing unit; and
a signal modifier;
wherein said at least one stage, said signal detector, said processing unit and said signal modifier provide a signal-to-noise-ratio enhanced signal to a receiver and wherein said at least one stage comprises a field nulling stage and wherein said field nulling stage comprises:
a receiving antenna;
a transmitting antenna;
a returning signal receiving circuit; and
a communications antenna signal delay element.

2. The device for reducing interference in wireless signals according to claim 1, wherein said at least one stage comprises a signal cancelling stage and said signal canceling stage comprises:
a first antenna of a first type;
a second antenna of a second type; and
a signal combiner.

3. The device for reducing interference in wireless signals according to claim 1, wherein said signal modifier comprises at least one of an amplitude equalizer, a phase shifter, and a group delayer.

4. The device for reducing interference in wireless signals according to claim 1, wherein said signal modifier comprises at least one of: a variable amplifier, a vector modulator, an active inductor and a frequency selection filter.

5. The device for reducing interference in wireless signals according to claim 1, wherein said return signal receiving circuit is connected to said processing unit.

6. The device for reducing interference in wireless signals according to claim 1, wherein said return signal receiving circuit comprises at least one of: a hardwires connection and a through-space signal receiver.

7. The device for reducing interference in wireless signals according to claim 1, wherein said communications antenna delay element comprises at least one of: an active delay element, a passive delay element, a variable delay element, a fixed delay element, and a selectable delay element.

8. The device for reducing interference in wireless signals according to claim 1, wherein said wireless signals comprise any type of desirably transmitted data and compromising any frequency of electromagnetic radiation.

9. A device for reducing interference in wireless signals comprising:
a plurality of antennae;
at least one stage connected to said plurality of antennae, said stage being one of a field nulling stage and a signal cancelling stage;
a signal detector;
a processing unit; and
a signal modifier;
wherein said at least one stage, said signal detector, said processing unit and said signal modifier provide a signal-to-noise-ratio enhanced signal to a receiver;
wherein said signal modifier comprises at least one of an amplitude equalizer, a phase shifter, and a group delayer, and wherein said signal modifier further comprises a first channel and a second channel; and
wherein said first channel comprises an amplitude equalizer and phase shifter and said second channel comprises a delay element.

10. A method for reducing interference in wireless signals comprising the steps of:
receiving a plurality of RFI burdened signals;
modifying at least one received RFI burdened signal;
providing at least one of field nulling and signal cancelling with respect to said at least one received RFI burdened signal; and
producing a signal-to-noise-ratio enhanced signal and wherein said step of providing at least one of field nulling and signal canceling comprises signal cancelling conducted by combining a first antenna signal modified with respect to at least one of amplitude and phase and a second antenna signal modified with respect to at least one group delay.

11. The method for reducing interference in wireless signals according to claim 10 wherein said wireless signals comprise any type of desirable transmitted information and any frequency of electromagnetic radiation.

12. A method for reducing interference in wireless signals comprising the steps of:
receiving a plurality of RFI burdened signals;
modifying at least one received RFI burdened signal;
providing at least one of field nulling and signal cancelling with respect to said at least one received RFI burdened signal; and
producing a signal-to-noise-ratio enhanced signal, wherein said step of providing at least one of field nulling and signal canceling comprises field nulling conducted by transmitting a receiving antenna signal that has been modified with respect to at least one of; amplitude and phase to establish a nulling field proximate a communications antenna, which nulling field is substantially amplitude equivalent to and anti-phase with respect to RFI content of a second field generated proximate communications antenna by an RFI burdened signal.

13. A method for reducing interference in wireless signals comprising the steps of:
receiving a plurality of RFI burdened signals;
modifying at least one received RFI burdened signal;
providing at least one of field nulling and signal cancelling with respect to said at least one received RFI burdened signal; and
producing a signal-to-noise-ratio enhanced signal, wherein said step of modifying at least one received RFI burdened signal comprises at least one of: amplitude equalizing, employing amplitude detecting and phase shifting, and determining a phase shift from a change in a combined signal amplitude resulting from a test phase shift.

14. A method for reducing interference in wireless signals comprising the steps of:
receiving a plurality of RFI burdened signals;
modifying at least one received RFI burdened signal;
providing at least one of field nulling and signal cancelling with respect to said at least one received RFI burdened signal; and
producing a signal-to-noise-ratio enhanced signal, wherein said step of modifying at least one received RFI burdened signal comprises determining an enhanced phase shift from a change in a combined signal amplitude resulting from a test phase shift.

15. A method for reducing interference in wireless signals comprising the steps of:
receiving a plurality of RFI burdened signals;
modifying at least one received RFI burdened signal;
providing at least one of field nulling and signal cancelling with respect to said at least one received RFI burdened signal; and
producing a signal-to-noise-ratio enhanced signal, wherein said step of modifying at least one received RFI burdened signal comprises at least one of: amplitude updating, phase shift updating, and delay updating.

16. A method for reducing interference in wireless signals comprising the steps of:
receiving a plurality of RFI burdened signals;
modifying at least one received RFI burdened signal;
providing at least one of field nulling and signal cancelling with respect to said at least one received RFI burdened signal; and
producing a signal-to-noise-ratio enhanced signal and further comprising the step of determining an RFI state, wherein said RFI state is at least one of: present, not present, weak and strong.

17. The method for reducing interference in wireless signals according to claim 16 further comprising the step of selecting interference between antenna signals based on a determined RFI state.

18. A method for reducing interference in wireless signals comprising the steps of:
receiving a plurality of RFI burdened signals;
modifying at least one received RFI burdened signals;
providing at least one of field nulling and signal cancelling with respect to said at least one received RFI burdened signal; and
producing a signal-to-noise-ratio enhanced signal, wherein said step of providing at least one of field nulling and signal canceling comprises field nulling followed by signal cancelling.

* * * * *